US011480650B2

(12) United States Patent
Rauhala et al.

(10) Patent No.: US 11,480,650 B2
(45) Date of Patent: Oct. 25, 2022

(54) EVALUATING A RADIO POSITIONING PERFORMANCE OF A RADIO POSITIONING SYSTEM

(71) Applicant: HERE Global B.V., Eindhoven (NL)

(72) Inventors: Petri Rauhala, Tampere (FI); Lauri Aarne Johannes Wirola, Tampere (FI); Marko Luomi, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 294 days.

(21) Appl. No.: 16/911,972

(22) Filed: Jun. 25, 2020

(65) Prior Publication Data

US 2020/0408870 A1 Dec. 31, 2020

(30) Foreign Application Priority Data

Jun. 26, 2019 (EP) .................................... 19182619

(51) Int. Cl.
*G01S 5/02* (2010.01)

(52) U.S. Cl.
CPC .................................. *G01S 5/0289* (2013.01)

(58) Field of Classification Search
CPC .. G01S 5/0289; G01S 5/0252; G01S 5/02521; G01S 5/02; G01S 5/02524; G01S 5/0257
See application file for complete search history.

(56) References Cited

U.S. PATENT DOCUMENTS

| 9,131,403 | B1* | 9/2015 | Courchesne | H04W 16/225 |
| 10,595,246 | B2* | 3/2020 | Kahtava | H04W 36/06 |
| 2006/0019679 | A1* | 1/2006 | Rappaport | H04W 64/00 |
| | | | | 455/456.1 |
| 2011/0037571 | A1* | 2/2011 | Johnson, Jr. | G08B 21/14 |
| | | | | 340/10.5 |

(Continued)

OTHER PUBLICATIONS

Extended European Search Report for Application No. EP 19182619.7 dated Dec. 16, 2019, 9 pages.

(Continued)

*Primary Examiner* — Hoang-Chuong Q Vu
(74) *Attorney, Agent, or Firm* — Alston & Bird LLP

(57) ABSTRACT

A method is provided that includes obtaining or holding available radio positioning support map information and geographic map information. An overlapping geographic area is covered by the radio positioning support map and the geographic map, which is dividable into a plurality of subareas. The method also includes determining, for each subarea of the plurality of subareas, a respective observed radio positioning support device density at least partially based on the radio positioning support map and a respective expected radio positioning support device density at least partially based on the geographic map. The method further includes evaluating, for each subarea of the plurality of subareas, a respective radio positioning performance in a respective subarea at least partially based on the respective observed radio positioning support device density and the respective expected radio positioning support device den- (Continued)

sity. A corresponding apparatus and computer readable storage medium are also provided.

20 Claims, 6 Drawing Sheets

(56) References Cited

U.S. PATENT DOCUMENTS

| | | |
|---|---|---|
| 2012/0129559 A1* | 5/2012 | Pochop, Jr. ........... H04W 16/18 |
| | | 455/507 |
| 2012/0182144 A1* | 7/2012 | Richardson ............. G01S 5/021 |
| | | 340/539.13 |
| 2012/0303556 A1 | 11/2012 | Lin et al. |
| 2014/0179237 A1 | 6/2014 | Gao et al. |
| 2015/0208329 A1 | 7/2015 | Wirola et al. |
| 2016/0066151 A1* | 3/2016 | Palanki ................... H04L 67/10 |
| | | 455/456.1 |
| 2016/0316342 A1* | 10/2016 | Narasimhan .......... H04W 4/029 |
| 2017/0325070 A1 | 11/2017 | Wirola et al. |
| 2017/0371024 A1 | 12/2017 | Ivanov et al. |
| 2018/0376292 A1 | 12/2018 | Ivanov et al. |
| 2019/0380311 A1* | 12/2019 | Crouthamel ......... A01K 29/005 |

OTHER PUBLICATIONS

E Silva et al., *Performance Considerations for Positioning With Signals of Opportunity*, IEEE (2016) 6 pages.

\* cited by examiner

EVALUATING A RADIO POSITIONING PERFORMANCE OF A RADIO POSITIONING SYSTEM

CROSS-REFERENCE TO RELATED APPLICATIONS

This application claims priority to European Application No. 19182619.7, filed Jun. 26, 2019, the entire contents of which are incorporated herein by reference.

FIELD OF THE INVENTION

The invention relates to the field of radio positioning and more specifically to evaluating a radio positioning performance of a radio positioning system.

BACKGROUND

Satellite signal based positioning technologies, which are mainly used outdoors, are usually not suited to deliver a satisfactory performance when used for indoor positioning, since satellite radio signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, Bluetooth low energy (BLE) based positioning systems, cellular network based positioning systems and wireless local area network (WLAN) based positioning systems.

Such a non-GNSS based radio positioning system (e.g. a self-contained positioning system) may be divided in at least three stages, an installation stage, a training stage and a positioning stage.

In the installation stage, dedicated radio positioning support devices (e.g. Bluetooth beacons) may be installed in the environment for which a positioning system is to be provided. Alternatively or additionally, a non-GNSS based radio positioning system may make use of existing radio devices like WLAN access points or cellular network nodes as radio positioning support devices.

In the subsequent training stage, training data are collected. The training data may be collected in the form of radio observation reports that are captured by mobile devices. A radio observation report may represent an observation position and one or more radio signals observed by the mobile device when scanning for observable radio signals at the observation position.

The training may be a continuous background process, in which mobile devices of a large number of consumers are continuously reporting captured radio observation reports to a positioning server collecting the radio observation reports. Consumers may consent to a participation in such a radio observation report collection, if their device is equipped with the needed functionality. This approach is also referred to as crowd-sourcing. Since crowd-sourcing is a background process that does not directly benefit the device user, it is desirable that the crowd-sourcing process is limited to what is necessary for training (e.g. generating or updating a radio positioning support map).

The collected radio observation reports may be used by the positioning server for generating or updating a radio positioning support map for positioning purposes.

In the positioning stage, a mobile device may estimate its current position based on one or more currently observed radio signals and the radio positioning support map that is available from the training stage. To this end, radio positioning support map information representing the radio positioning support map that has been generated in the training stage may be provided from the positioning server via the Internet to the mobile device as assistance information for use in position estimation. Alternatively, the radio positioning support map information may be stored in the positioning server to which the mobile device may connect to via the Internet for obtaining a position estimate.

SUMMARY OF SOME EMBODIMENTS OF THE INVENTION

According to an exemplary aspect of the invention, a method is disclosed, wherein the method comprises:
  obtaining or holding available radio positioning support map information representing a radio positioning support map of a radio positioning system and geographic map information representing a geographic map, wherein an overlapping geographic area is covered by the radio positioning support map and the geographic map, wherein the overlapping geographic area is dividable into a plurality of subareas of the overlapping geographic area;
  determining, for each subarea of the plurality of subareas, a respective observed radio positioning support device density at least partially based on the radio positioning support map;
  determining, for each subarea of the plurality of subareas, a respective expected radio positioning support device density at least partially based on the geographic map;
  evaluating, for each subarea of the plurality of subareas, a respective radio positioning performance of the radio positioning system in the respective subarea of the plurality of subareas at least partially based on the respective observed radio positioning support device density and the respective expected radio positioning support device density.

The disclosed method may be performed by at least one apparatus (e.g. any one embodiment of the apparatus(es) disclosed below). For example, the disclosed method may be performed by a server (e.g. a positioning server).

Obtaining information (e.g. the radio positioning support map information or the geographic map information) may be understood to mean that the information are received, for example received by the apparatus performing the disclosed method. Alternatively or additionally, obtaining information may be understood to mean that the information is obtained as a result of determining the information.

Holding available information (e.g. the radio positioning support map information or the geographic map information) may be understood to mean that the information are stored in a memory (e.g. a memory of the apparatus performing the disclosed method).

Information (e.g. the radio positioning support map information or the geographic map information) may be understood to be encoded information, for example in the form of data or a signal. Accordingly, map information (e.g. the radio positioning support information or the geographic map information) may represent a certain map (e.g. the radio positioning support map or the geographic map information) by containing this certain map in encoded form.

The geographic map may for example be a navigational or street map which enables determining a route from a first geographic position to a second geographic position in a geographic area covered by the geographic map. To this end, the geographic map may represent route links like streets, footpaths, cycle paths, etc. Moreover, the geographic map may be understood to be indicative of different area types like forest/lake/field areas, sub-urban (e.g. single house or apartment house) areas, urban (e.g. high-building) areas, residential areas, commercial areas, industrial areas and rural areas.

The radio positioning support map may be configured to enable estimating a position of a mobile device at least partially based on this radio positioning support map when the mobile device is located in a geographic area covered by the radio positioning support map. To this end, the radio positioning support map may represent, for each radio positioning support device of a plurality of radio positioning support devices, at least one of a respective radio coverage or a respective installation position. Therein, a respective radio coverage of a respective radio positioning support device of the plurality of radio positioning support devices may be understood to describe the geographical area within which it is expected (e.g. based on radio observation reports collected during the training stage as disclosed above) that a radio signal transmitted by the respective radio positioning support device is observable (e.g. receivable by a mobile device with a minimum quality, e.g. a minimum signal-to-noise ratio and/or a minimum signal power, e.g. at least −90 dBm or −95 dBm). Nevertheless, it is to be understood that the real radio coverage of such a radio positioning support device may deviate from the radio coverage as represented by the radio positioning support map. If a mobile device observes one or more radio signals transmitted by one or more of the plurality of radio positioning support devices at its current position, it may for example estimate its current position to be the geographic position (or to be in the geographical area) where the radio coverage(s) of the one or more of the plurality of radio positioning support devices represented by the radio positioning support map overlap.

It is to be understood that the radio positioning support map and the geographic map may cover the same geographic area or at least partially different geographic areas. Accordingly, the overlapping geographic area may be understood to be the geographic area which is covered by both (1) the radio positioning support map and (2) the geographic map.

That the overlapping geographic area is dividable into a plurality of subareas of the overlapping geographic area may be understood to mean that the overlapping geographic area is logically divided into the plurality of subareas of the overlapping geographic area, for example according to a predetermined grid system having a predetermined or adjustable grid spacing. Examples of such a predetermined grid system are the Military Grid Reference System (MGRS), the Universal Transverse Mercator (UTM) grid system or the Universal Polar Stereographic (UPS) grid system. It is however to be understood that equally well any other (e.g. proprietary) grid system having a predetermined or adjustable grid spacing may be used.

As a result of the determining, for each subarea of the plurality of subareas, a respective observed radio positioning support device density a plurality of observed radio positioning support device densities may be obtained; and, as a result of the determining, for each subarea of the plurality of subareas, a respective expected radio positioning support device density a plurality of expected radio positioning support device densities may be obtained. It is to be understood that these determining steps may be performed according to predetermined rules like a predetermined algorithm, a predetermined association, or a combination thereof.

A radio positioning support device density may be understood to represent a number of radio positioning support devices per unit area. Therein, the number of radio position support devices may be understood to be at least one of (1) the number of radio positioning support devices installed in a certain area or (2) the number of radio positioning support devices from which radio signals are observable in this certain area; and the area may be understood to be the surface area of this certain area (e.g. in case of a two-dimensional geographic map: the surface area of the earth as represented by the geographic map) or the combined surface and floor area of this certain area (e.g. in case of a three-dimensional geographic map: the sum of the surface area of the earth and the floor area (e.g. total floor area of all floors) of one or more buildings as represented by the geographic map). Accordingly, the respective radio positioning support device density determined for a respective subarea of the plurality of subareas may represent the number of radio positioning support devices installed in the respective subarea or the number of radio positioning support devices from which radio signals are observable in the respective subarea per unit area of the respective subarea (e.g. in case of a two-dimensional geographic map: the surface area of the respective subarea as represented by the geographic map; or in case of a three-dimensional geographic map: the sum of the surface area of the respective subarea and the floor area of any building within the respective subarea as represented by the geographic map).

As disclosed above, the radio positioning support map may represent, for each radio positioning support device of a plurality of radio positioning support devices, at least one of a respective radio coverage or a respective installation position. Accordingly, the respective observed radio positioning support device density determined for each subarea of the plurality of subareas at least partially based on the radio positioning support map may represent at least one of (1) the number of radio positioning support devices installed in the respective subarea as represented by the radio positioning support map per unit area of the respective subarea or (2) the number of radio positioning support devices from which radio signals are observable in the respective subarea as represented by the radio positioning support map per unit area of the respective subarea.

The respective observed radio positioning support device density in a respective subarea of the plurality of subareas may be considered to be indicative of the actual radio positioning performance of the radio positioning system in the respective subarea of the plurality of subareas because the higher the respective observed radio positioning support device density the higher is the number of radio positioning support devices which are expected to be available in the respective subarea for positioning estimating (e.g. radio positioning support devices from which radio signals are observable in the respective subarea for position estimating). Accordingly, each of the plurality of observed radio positioning support device densities obtained as a result of the determining may be considered to be indicative of the actual radio positioning performance of the radio positioning system in the respective subarea of the plurality of subareas.

For different area types like forest/lake/field areas, suburban (e.g. single house or apartment house) areas, urban (e.g. high-building) areas, residential areas, commercial areas, industrial areas and rural areas different radio positioning support device densities may be expected, for example based on manual analysis of exemplary areas of the respective area type. Accordingly, the respective expected radio positioning support device density for a respective area type may be predetermined, for example by associating the respective area type with the respective expected radio positioning support device density. As disclosed above, the geographic map may be understood to be indicative of different area types like forest/lake/field areas, sub-urban (e.g. single house or apartment house) areas, urban (e.g. high-building) areas, residential areas, commercial areas, industrial areas and rural areas. Accordingly, the respective expected radio positioning support device density determined for each subarea of the plurality of subareas at least partially based on the geographic map may represent the expected radio positioning support device density that is expected for the respective area type of the respective subarea as indicated by the geographic map.

The respective expected radio positioning support device density in a respective subarea of the plurality of subareas may be considered to be indicative of the achievable radio positioning performance of the radio positioning system in the respective subarea of the plurality of subareas. This may be understood to mean that it is expected that the actual radio positioning performance of the radio positioning system in a respective subarea of the plurality of subareas cannot be improved over the achievable radio positioning performance of the radio positioning system in the respective subarea of the plurality of subareas (e.g. without installation of dedicated radio positioning support devices in the respective subarea of the plurality of subareas). Accordingly, each of the plurality of expected radio positioning support device densities obtained as a result of the determining may be considered to be indicative of the achievable radio positioning performance of the radio positioning system in the respective subarea of the plurality of subareas.

The respective radio positioning performance of the radio positioning system in the respective subarea of the plurality of subareas may be understood to be a function of the actual radio positioning performance of the radio positioning system in the respective subarea and the achievable radio positioning performance of the radio positioning system in the respective subarea. In particular, evaluating, for each subarea of the plurality of subareas, a respective radio positioning performance of the radio positioning system in the respective subarea of the plurality of subareas may be understood to mean that it is evaluated whether the radio positioning performance is improvable or satisfactory (i.e. not improvable). Therein, the respective radio positioning performance may be evaluated to be improvable if an improved radio positioning performance is determined or expected to be achievable for the respective subarea; and a radio positioning performance may be evaluated to be satisfactory if an improved radio positioning performance is determined or expected to be not achievable for the respective subarea.

For example, the evaluating, for each subarea of the plurality of subareas, a respective radio positioning performance of the radio positioning system in the respective subarea of the plurality of subareas may be based on the following two assumptions: (1) If the respective observed radio positioning support density determined for a respective subarea is smaller than the respective expected radio positioning support density determined for the respective subarea, this may be considered to indicate that more radio positioning support devices are expected to be available in the respective subarea than represented by the radio positioning support map (e.g. represented in form of installation positions or radio coverages). In this case, the radio positioning performance may for example be expected to be improved by further collecting radio observation reports and, thus, it may be determined (e.g. as a result of the evaluating) that the radio positioning performance of the radio positioning system in the respective subarea of the plurality of subareas is improvable. (2) If the respective observed radio positioning support density determined for a respective subarea is not smaller than the respective expected radio positioning support density determined for the respective subarea, this may be considered to indicate that no more radio positioning support devices are expected to be available in the respective subarea than represented by the radio positioning support map (e.g. represented in form of installation positions or radio coverages). In this case, no further improvement of the radio positioning performance may be expected by further collecting radio observation reports and, thus, it may be determined (e.g. as a result of the evaluating) that the radio positioning performance of the radio positioning system in the respective subarea of the plurality of subareas is satisfactory (i.e. not improvable).

According to a further exemplary aspect of the invention, an apparatus is disclosed, wherein the apparatus comprises means for performing any one embodiment of the disclosed method (e.g. the steps of any one embodiment of the disclosed method) or a part thereof (e.g. at least some steps of any one embodiment of the disclosed method).

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code, the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example, the disclosed apparatus(es) may be (a) module(s) or component(s) for (a) server(s), for example (a) chip(s) or chipset(s). Alternatively, the disclosed apparatus(es) may be (a) server(s). The server may be part of a plurality of servers (e.g. forming a server cloud) or may be represented by such a plurality of servers (e.g. forming a server cloud). Alternatively or additionally, the server may be part of a radio positioning system, for example as positioning server.

It is to be understood that the disclosed apparatus(es) may comprise only the disclosed components (e.g. means) or may further comprise one or more additional components (e.g. means). Examples of such additional components are a communication interface (e.g. wireless communication interface like a receiver, a transmitter and/or a transceiver), a user interface (e.g. a touch-sensitive display, a keyboard, a touchpad, a display, etc.), etc.

According to a further exemplary aspect of the invention, a system is disclosed which comprises a server and one or more mobile devices, wherein the server and the one or more mobile devices are configured to cooperate for performing any one embodiment of the disclosed method (e.g. the steps of any one embodiment of the disclosed method) or one of the server and the one or more mobile devices is configured for performing any one embodiment of the disclosed method (e.g. the steps of any one embodiment of the disclosed method) alone.

The system may be a radio positioning system.

For example, the server may be any one embodiment of the disclosed apparatus(es) (e.g. a positioning server of the radio positioning system). Each of the one or more mobile devices may be one of a smart home device, a smartphone, a tablet computer, a notebook computer, a smart watch or a smart band. As disclosed above, the one or more mobile devices may capture radio observation reports and report the captured radio observation reports to the server for determining (e.g. generating or updating) the radio positioning support map.

Optionally, the system may further comprise the plurality of radio positioning support devices.

According to a further exemplary aspect of the invention, a non-transitory computer readable storage medium is disclosed, in which computer program code is stored. The computer program code may for example be the below disclosed computer program code. The computer program code could be stored in the computer readable storage medium in the form of instructions encoding the computer-readable storage medium. The computer readable storage medium may be intended for taking part in the operation of an apparatus (e.g. any one embodiment of the disclosed apparatus(es)), like an internal or external hard disk of a computer, or be intended for distribution of the program code, like an optical disc.

According to a further exemplary aspect of the invention, a computer program code is disclosed, the computer program code when executed by a processor (or by a plurality of processors) causing an apparatus to perform any one embodiment of the disclosed method (e.g. the steps of any one embodiment of the disclosed method).

The disclosed method, apparatus(es), system, non-transitory computer readable storage medium and computer program code may be for evaluating a radio positioning performance of a radio positioning system.

In the following, further features and embodiments of these exemplary aspects of the invention will be described.

According to an exemplary embodiment of the invention, the radio positioning support map represents, for each radio positioning support device of a plurality of radio positioning support devices, at least one of a respective radio coverage or a respective installation position.

As disclosed above, the respective radio coverage of a respective radio positioning support device of the plurality of radio positioning support devices may be understood to describe the geographical area within which it is expected that a radio signal transmitted by the respective radio positioning support device is observable (e.g. receivable by a mobile device with a minimum quality, e.g. a minimum signal-to-noise ratio and/or a minimum signal power, e.g. at least −90 dBm or −95 dBm).

For example, the radio positioning support map may contain, for each radio positioning support device of the plurality of radio positioning support devices, a respective radio coverage model representing the respective radio coverage of the respective radio positioning support device. For example, a radio coverage model of such a radio positioning support device may describe the coverage area within which radio signals transmitted (e.g. broadcasted) by this radio positioning support device are expected to be observable. An example of such a radio coverage model of a radio positioning support device is a geometric model like a geometric shape representing the expected coverage area of this radio positioning support device within which it is expected that a radio signal transmitted (e.g. broadcasted) by this radio positioning support device is observable (e.g. receivable with a minimum quality, e.g. a minimum signal-to-noise ratio and/or a minimum signal power, e.g. at least −90 dBm or −95 dBm). Another example of such a radio coverage model of a certain radio positioning support device is a matrix model like a radio image representing an expected radio signal strength field of a radio signal transmitted (e.g. broadcasted) by this radio positioning support device. It is however to be understood that real radio coverage of such a radio positioning support device may deviate from the expected radio coverage as described by such a radio coverage model.

The respective installation position of a respective radio positioning support device of the plurality of radio positioning support devices may be understood to be a fixed position at which the respective radio positioning support device is installed and operated (i.e. from which the respective radio positioning support device transmits radio signals). For example, the radio positioning support map may represent the respective installation position for each radio positioning support device of the plurality of radio positioning support devices in form of position coordinates (like longitude and latitude of a global coordinate system, for example coordinates according to WGS-84 (World Geodetic System 1984)).

For example, the respective observed radio positioning support device density may be determined for each subarea of the plurality of subareas at least partially based on at least one of (1) the radio coverages or (2) the installation positions represented by the radio positioning support map. As disclosed above, this may be understood to mean that the radio coverages represented by the radio positioning support map are used for determining the respective number of radio positioning support devices from which radio signals are expected to in each subarea of the plurality of subareas and that the installation positions represented by the radio positioning support map are used for determining the respective number of radio positioning support devices which are installed in each subarea of the plurality of subareas. The respective observed radio positioning support device density may then be determined to correspond to the respective number of radio positioning support devices per unit area of the respective subarea of the plurality of subareas.

According to an exemplary embodiment of the invention, each radio positioning support device of the plurality of radio positioning support devices is one of:
  a Bluetooth radio device;
  a WLAN radio device;
  a cellular radio device;
  a LPWAN radio device.

A Bluetooth radio device may comprise a Bluetooth and/or Bluetooth low energy (BLE) radio interface, which includes at least a Bluetooth and/or BLE transmitter. The Bluetooth and/or BLE transmitter may also be a part of a Bluetooth and/or BLE transceiver. The Bluetooth and/or BLE radio interface may be configured to transmit Bluetooth and or BLE radio signals. A Bluetooth radio device that is employed for the present invention may be any kind of Bluetooth beacon. The Bluetooth standards are specified by the Bluetooth Special Interest Group and are presently available under https://www.bluetooth.com/.

Such Bluetooth radio devices like Bluetooth beacons can be easily installed at various installation positions and require little to no maintenance. Also, Bluetooth technologies are supported by many mobile devices by default such as most smartphones, most tablet computers, most notebook computers, most smart watches and most smart bands, etc. Using Bluetooth radio devices may thus have the effect that many mobile devices may be able to receive radio signals transmitted by or communicate with the Bluetooth radio devices without any adaptation of hardware. As a result, the approach may be globally scalable and have low maintenance and deployment costs. The Bluetooth radio devices may be stand-alone devices or be integrated into or attached to some other devices. Bluetooth radio devices, in particular in low energy mode, require comparably little energy and the use of Bluetooth low energy may enable a positioning with limited energy consumption at all involved devices.

A WLAN radio device may comprise a WLAN radio interface, which for example includes a WLAN transceiver. The WLAN radio interface may be configured to transmit and/or receive WLAN radio signals. Accordingly, the radio signal transmitted by such a WLAN radio device may be a WLAN radio signal. A WLAN radio device that is employed for the present invention may be any kind of WLAN access point. WLAN is for example specified by the standards of the IEEE 802.11 family (http://www.ieee.org/). In particular, the IEEE 802.11mc standard specifies a solution for determining round-trip-time values between two WLAN devices, like a WLAN access point and a mobile device.

A cellular radio device may comprise a cellular radio interface, which for example includes a cellular transceiver. The cellular radio interface may be configured to transmit and/or receive cellular radio signals. Accordingly, the radio signal transmitted by such a cellular radio device may be a cellular radio signal. A cellular radio device that is employed for the present invention may for example be a base station of a cellular communication network like a 2G/3G/4G/5G cellular communication network. The 2G/3G/4G/5G cellular radio communication standards are developed by the 3GPP and presently available under http://www.3gpp.org/.

A LPWAN radio device may comprise an LPWAN radio interface, which for example includes an LPWAN transceiver. The LPWAN radio interface may be configured to transmit and/or receive LPWAN radio signals. Accordingly, the radio signal transmitted by such an access point of an LPWAN may be an LPWAN radio signal. A LPWAN radio device that is employed for the present invention may for example be a LPWAN access point. Examples of LPWAN specifications are the LoRaWAN specification developed by the LoRa Alliance and presently available under https://lora-alliance.org/as well as the Narrowband IoT (NB-IoT) specification developed by 3GPP and presently available under http://www.3gpp.org/.

Like Bluetooth technologies, WLAN and cellular technologies are supported by many mobile devices by default such as most smartphones, most tablet computers, most notebook computers, most smart watches and most smart bands, etc. Moreover, in particular WLAN radio devices or cellular radio devices are expected to be available (i.e. already exist) at least in most area types and, thus, their radio signals can be used for positioning estimating without deployment of dedicated radio positioning support devices.

According to an exemplary embodiment of the invention, the respective expected radio positioning support device density is determined for each subarea of the plurality of subareas by at least one of:
 determining, for each subarea of the plurality of subareas, a respective subarea type at least partially based on the geographic map;
 determining, for each subarea of the plurality of subareas, the respective expected radio positioning support device density at least partially based on the respective subarea type of the respective subarea of the plurality of subareas.

For example, the respective subarea type determined for each subarea of the plurality of subareas is part of a plurality of subarea types (e.g. a plurality of predetermined subarea types). Examples of such subarea types are forest/lake/field areas, sub-urban (e.g. single house or apartment house) areas, urban (e.g. high-building) areas, residential areas, commercial areas, industrial areas and rural areas. For example, the geographic map may be understood to be indicative of the respective subarea type of the plurality of subarea types for each subarea of the plurality of subareas, for example by representing the respective subarea type or by representing one or more characteristic features of the respective subarea type. Accordingly, the respective subarea type may be determined for each subarea of the plurality of subareas by determining the respective subarea type of the respective subarea of the plurality of subareas as indicated by the geographic map.

Moreover, the respective expected radio positioning support device density determined for each subarea of the plurality of subareas is part of a plurality of expected radio positioning support device densities (e.g. a plurality of predetermined expected radio positioning support device densities), wherein each subarea type of the plurality of subarea types may be associated with a respective expected radio positioning support device density of the plurality of expected radio positioning support device densities. As disclosed above, for different subarea types like forest/lake/field areas, sub-urban (e.g. single house or apartment house) areas, urban (e.g. high-building) areas, residential areas, commercial areas, industrial areas and rural areas different radio positioning support device densities may be expected, for example based on manual analysis of exemplary areas of the respective subarea type. Accordingly, the respective expected radio positioning support device density for a respective area type may be predetermined, for example by associating the respective area type with the respective expected radio positioning support device density. Accordingly, the respective expected radio positioning support device density for each subarea of the plurality of subareas may be determined to be the expected radio positioning support device density that is associated with the respective subarea type of the respective subarea of the plurality of subareas.

In certain embodiments of the invention, the method comprises at least one of:
 determining the plurality of expected radio positioning support device densities;
 determining the plurality of subarea types;
 associating each subarea type of the plurality of subarea types with a respective expected radio positioning support device density of the plurality of expected radio positioning support device densities.

The plurality of subarea types may be determined at least partially based on another geographic map, for example according to predetermined rules (e.g. a predetermined algorithm like a clustering algorithm). For example, the plurality of subarea types may be determined by identifying groups of similar subareas of the geographic area covered by the other geographic map, for example according to a clustering algorithm which analysis one or more features represented by the geographic map which are considered to be characteristic for the respective subarea type. Each group of similar subareas may then be determined to be a respective subarea type of the plurality of subarea types. It is however to be understood that the invention is not limited to this. Alternatively, the plurality of subarea types may for example be predetermined and may comprise one or more of the following subarea types: forest/lake/field area, sub-urban (e.g. with single house or apartment house) area, urban (e.g. high-building) area, residential area, commercial area, industrial area and rural area. The respective subarea type of each subarea may then be represented by the geographic map.

The plurality of expected radio positioning support device densities may be determined at least partially based on another radio positioning support map, for example according to predetermined rules (e.g. a predetermined algorithm for computing a mean). For example, the other radio positioning support map may be considered to represent a respective radio coverage or a respective installation position for all radio positioning support devices available in the geographic area covered by the other radio positioning support map, for example because the other radio positioning support map has been determined (e.g. generated or updated) based on systematically captured radio observation reports. For each group of subareas of the same subarea type, the respective expected radio positioning support device density may then for example be determined to correspond to the mean radio positioning support device density (e.g. arithmetic mean radio positioning support device density) of the respective radio positioning support device densities determined at least partially based on the other radio positioning support map for the respective group of subareas and, subsequently, the respective expected radio positioning support device density may be associated with the respective subarea type. It is however to be understood that the invention is not limited to this. Alternatively, the plurality of expected radio positioning support device densities and the association of each subarea type of the plurality of subarea types with a respective expected radio positioning support device density of the plurality of expected radio positioning support device densities may for example be predetermined.

According to an exemplary embodiment of the invention, the respective radio positioning performance of the radio positioning system in the respective subarea of the plurality of subareas is evaluated for each subarea of the plurality of subareas by at least one of: determining, for each subarea of the plurality of subareas, a respective ratio of the respective observed radio positioning support device density to the respective expected radio positioning support device density;

determining, for each subarea of the plurality of subareas, whether or not the respective ratio of the respective observed radio positioning support device density to the respective expected radio positioning support device density is smaller than a predetermined threshold value or smaller than 1;

determining the respective radio positioning performance of the radio positioning system in the respective subarea of the plurality of subareas to be improvable if it is determined that the respective ratio of the respective observed radio positioning support device density to the respective expected radio positioning support device density is smaller than the predetermined threshold value or smaller than 1;

determining the respective radio positioning performance of the radio positioning system in the respective subarea of the plurality of subareas to be satisfactory if it is determined that the respective ratio of the respective observed radio positioning support device density to the respective expected radio positioning support device density is not smaller than a predetermined threshold value or not smaller than 1.

The respective ratio of the respective observed radio positioning support device density to the respective expected radio positioning support device density may be understood to correspond to the result of dividing the respective observed radio positioning support device density by the respective expected radio positioning support device density.

To give a few non-limiting examples, the predetermined threshold value may be a value from the range between 0.75 and 1 (e.g. 0.75, 0.8, 0.9, 1). For example, the predetermined threshold value may be predetermined such that the respective ratio of the respective observed radio positioning support device density to the respective real radio positioning support device density is expected (e.g. with a likelihood of at least 90% or 95% in view of potential deviations of the respective observed radio positioning support device density to the respective real radio positioning support device density) to be smaller than 1 if it is determined that the respective ratio of the respective observed radio positioning support device density to the respective expected radio positioning support device density is smaller than the predetermined threshold value.

If the respective ratio of the respective observed radio positioning support device density to the respective expected radio positioning support device density is smaller than the predetermined threshold value or smaller than 1, this may be considered to indicate that more radio positioning support devices are expected to be available in the respective subarea than represented by the radio positioning support map (e.g. represented in form of installation positions or radio coverages). In this case, the radio positioning performance may for example be expected to be improved by further collecting radio observation reports and, thus, it may be determined (e.g. as a result of the evaluating) that the radio positioning performance of the radio positioning system in the respective subarea of the plurality of subareas is improvable.

If the respective ratio of the respective observed radio positioning support device density to the respective expected radio positioning support device density is not smaller than the predetermined threshold value or not smaller than 1, this may be considered to indicate that no more radio positioning support devices are expected to be available in the respective subarea than represented by the radio positioning support map (e.g. represented in form of installation positions or radio coverages). In this case, no further improvement of the radio positioning performance may be expected by further collecting radio observation reports and, thus, it may be determined (e.g. as a result of the evaluating) that the radio positioning performance of the radio positioning system in the respective subarea of the plurality of subareas is satisfactory (i.e. not improvable).

According to an exemplary embodiment of the invention, the method further comprises at least one of:

controlling of updating the radio positioning support map at least partially based on a result of the evaluating, for each subarea of the plurality of subareas, the respective radio positioning performance of the radio positioning system in the respective subarea of the plurality of subareas;

determining control information for capturing radio observation reports in the overlapping geographic area at least partially based on the result of the evaluating, for each subarea of the plurality of subareas, the respective radio positioning performance of the radio positioning system in the respective subarea of the plurality of subareas;

providing the control information to one or more mobile devices.

As disclosed above, the radio positioning support map may be updated based on a plurality of radio observation reports captured by one or mobile devices during the training stage of the radio positioning system. For example, each radio observation report of the plurality of radio observation reports may represent at least one of (1) an observation position, (2) one or more radio signals observed by a respective mobile device of the one more mobile devices at the observation position, (3) one or more radio signal parameters of the observed one or more radio signals measured by the respective mobile device or (4) a combination thereof. The radio position reports may be received from the one or more mobile devices and, subsequently, collected (e.g. stored) for updating the radio positioning support map.

Accordingly, updating the radio positioning support map may be controlled by at least one of (1) controlling collecting radio observation reports or (2) controlling capturing radio observation reports.

For example, controlling collecting radio observation reports may be understood to mean to collect (e.g. store) radio observation reports captured in one or more certain subareas of the plurality of subareas and/or with a certain collection rate or frequency. To give a non-limiting example, only radio observation reports captured in any subarea of the plurality of subareas for which the respective radio positioning performance is determined (e.g. as a result of the evaluating) to be improvable may be collected (e.g. stored) and any other radio observation reports may be rejected (i.e. not collected). To give another non-limiting example, radio observation reports captured in any subarea of the plurality of subareas for which the respective radio positioning performance is determined (e.g. as a result of the evaluating) to be improvable may be collected (e.g. stored) with a higher collection rate or frequency than radio observation reports captured in any other subarea of the plurality of subareas. Therein, the collection rate or frequency may define how many radio observation reports are collected (e.g. stored) per unit time.

For example, controlling capturing radio observation reports may be understood to mean to cause one or more mobile devices to capture radio observation reports in the overlapping geographic area, for example to capture radio observation reports in one or more certain subareas of the plurality of subareas and/or with a certain capturing rate or frequency. To give a non-limiting example, the one or more mobile devices may be caused to only capture radio observation reports in each subarea of the plurality of subareas for which the respective radio positioning performance is determined (e.g. as a result of the evaluating) to be improvable. To give another non-limiting example, the one or more mobile devices may be caused to capture radio observation reports in each subarea of the plurality of subareas for which the respective radio positioning performance is determined (e.g. as a result of the evaluating) to be improvable with a higher capturing rate or frequency than in any other subarea of the plurality of subareas. Therein, the capturing rate or frequency may define how many radio observation reports are captured per unit time.

Control information for capturing radio observation reports in the overlapping geographic area may be configured to cause one or more mobile devices to capture radio observation reports in the overlapping geographic area, for example to capture radio observation reports in one or more subareas of the plurality of subareas and/or with a certain capturing rate or frequency. To this end, the control information may for example indicate to the one or more mobile devices at least one of (1) the one or more subareas of the plurality of subareas where radio observation reports are to be captured and (2) the capturing rate or frequency with which radio observation reports are to be captured in the one or more subareas of the plurality of subareas.

Providing the control information to the one or more mobile devices may for example be understood to mean that the control information are provided (e.g. stored in a memory) for retrieval by the one or more mobile devices or transmitted to the one or more mobile devices.

According to an exemplary embodiment of the invention, the method further comprises at least one of:

collecting a plurality of radio observation reports captured by one or more mobile devices in the overlapping geographic region;

updating the radio positioning support map at least partially based on the plurality of radio observation reports.

Collecting the plurality of radio observation reports may be understood to mean that the plurality of radio observation reports (e.g. the plurality of radio observation reports that have been previously received from one or more mobile devices) is stored in a memory (e.g. a memory of the apparatus performing the disclosed method).

Updating the radio positioning support map at least partially based on the plurality of radio observation reports may be understood to mean that the already existing radio positioning support map is updated. To this end, the updating is at least partially based on the existing radio positioning support map and the plurality of radio observation reports. For example, the updating may be performed according to a predetermined map updating algorithm, which may for example enable determining, for one or more radio positioning support devices (e.g. each radio positioning support device for which at least one radio observation report of the plurality of radio observation reports indicates that a respective radio signal transmitted by the respective radio positioning support device is observable within the geographic area covered by the radio positioning support map), of at least one of (1) a representation of a respective radio coverage or (2) a representation of a respective installation position.

According to an exemplary embodiment of the invention, the geographic map is or comprises at least one of the following map types:

a two-dimensional map;
a three-dimensional map;
a navigational or street map;
a floor map;
a topographic map.

A two-dimensional map may be a two-dimensional representation of the geographical area or a part of the geographical area covered by the two-dimensional map.

A three-dimensional map may be a three-dimensional representation of the geographical area or a part of the geographical area covered by the three-dimensional map. For example, a three-dimensional map may contain one or more three-dimensional representations and/or one or more floor maps of one or more buildings which are located within the geographical area covered by the three-dimensional map.

A navigational or street map may represent route links like streets, footpaths, cycle paths, etc. As disclosed above, it may enable determining a route from a first geographic position to a second geographic position in a geographic area covered by the geographic map. A navigational or street map may be a two-dimensional or a three-dimensional map.

A floor map may represent a floor plan or floor layout of a floor of a building. As disclosed above, a floor map may be part of a three dimensional building.

A topographic map may represent at least one of ground relief (e.g. landforms and terrain), drainage (e.g. lakes and rivers), administrative areas, area or subarea types (e.g. forest/lake/field areas, sub-urban (e.g. single house or apartment house) areas, urban (e.g. high-building) areas, residential areas, commercial areas, industrial areas and rural areas), route links or a combination thereof. A topographic map may be a two-dimensional or a three-dimensional map.

It is to be understood that the geographic map may be a combination of the above disclosed map types. Moreover, the geographic map is not limited to these map types.

According to an exemplary embodiment of the invention, each subarea of the plurality of subareas corresponds to a respective grid area of a grid system having a predetermined or adjustable grid spacing.

A grid system having a predetermined grid spacing may have fixed grid areas, whereas a grid system having an adjustable grid spacing may allow adjusting the grid areas (for example as a function of a zoom level or based on user input).

The grid system may for example be a square grid with grid lines intersecting each other at right angles and defining square areas as grid areas. To give a few non-liming examples, such a square grid may have a predetermined grid spacing of 50 m, 25 m, 20 m, or 10 m corresponding to 50 m×50 m, 25×25, 20 m×20 m, or 10 m×10 m square grid areas.

Alternatively or additionally, the grid system may be a predetermined grid system like the Military Grid Reference System (MGRS), the Universal Transverse Mercator (UTM) grid system or the Universal Polar Stereographic (UPS) grid system.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
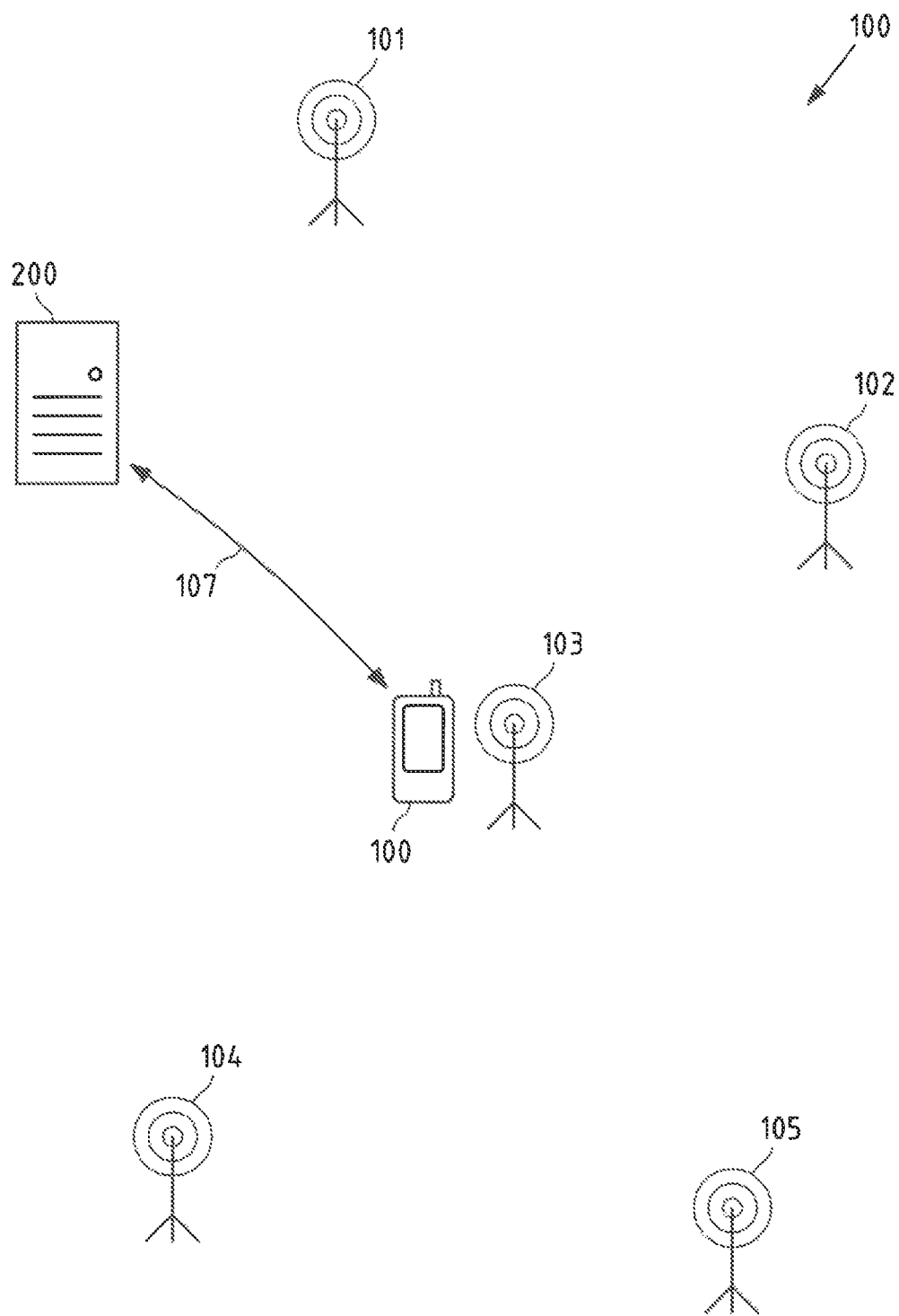
FIG. 1 is a block diagram of an exemplary embodiment of a system according to the invention.

FIG. 1 is a schematic high-level block diagram of a system 100 according to an exemplary aspect of the invention. In the following, it is assumed that system 100 is a radio positioning system.

System 100 comprises a positioning server 200 and a plurality of radio positioning support devices 101 to 105. Optionally, system 100 may comprise a mobile device 106. It is to be understood that system 100 may comprise further radio positioning support devices and mobile devices. In the following, it is thus referred to radio positioning support devices 101 to 105 and mobile device 106 without limiting the scope of the invention.

Indoor radio positioning system 100 is not limited to a single positioning server 200, but may optionally comprise a plurality of servers (e.g. forming a server cloud). Accordingly, the positioning server 200 may be part of such a plurality of servers (e.g. a server cloud) or may be represented by such a plurality of servers (e.g. a server cloud).

In system 100, positioning server 200 and mobile device 106 may be configured to communicate with each other as indicated by communication path 107. It is to be understood that communication path 107 may comprise one or more communication links (e.g. one or more wireless communication links or one or more wireline communication links or a combination thereof). For example, communication path 107 may include one or more communication links over one or more communication networks. For example, communication path 107 is or includes a communication link over a cellular communication network like a 2G/3G/4G/5G cellular communication network. The 2G/3G/4G/5G cellular radio communication standards are developed by the 3GPP and presently available under http://www.3gpp.org/.

Positioning server 200 may be configured for generating and updating a radio positioning support map of system 100 based on a plurality of radio observation reports captured and reported to positioning server 200 by one or more mobile devices like mobile device 106. As disclosed in more details above, each radio observation report of the plurality of radio observation reports may represent at least one of (1) an observation position, (2) one or more radio signals observed by a respective mobile device of the one more mobile devices at the observation position, (3) one or more radio signal parameters of the observed one or more radio signals measured by the respective mobile device or (4) a combination thereof. The radio positioning support map may be configured to enable mobile device 106 to estimate its position at least partially based on this radio positioning support map when the mobile device is located in the geographical area covered by the radio positioning support map. Positioning server 200 may provide (e.g. transmit) radio positioning support map information representing the radio positioning support map to mobile device 106 via communication path 107.

Radio positioning support devices 101 to 105 may be WLAN access points fixedly installed in the geographical area covered by the radio positioning support map and may be configured for transmitting and receiving WLAN radio signals. For example, they may be configured for automatically and repeatedly transmitting WLAN radio signals. In particular, they may be configured to support WLAN according to a standard of the IEEE 802.11-standard family. The specifications of the IEEE 802.11 standard-family are presently available under https://ieeexplore.ieee.org/. It is to be understood that system 100 is not limited to WLAN access points as radio positioning support devices 101 to 105. In the following, it is thus referred to radio positioning support devices 101 to 105 as WLAN access points 101 to 105 for exemplary purposes only without limiting the scope of the invention.

For example, mobile device 106 may be one of a smartphone, a tablet computer, a notebook computer, a smart watch and a smart band. Mobile device 106 may be configured for transmitting and receiving WLAN radio signals.

Moreover, mobile device 106 may be configured for estimating its position based on observed (e.g. received) WLAN radio signals. To this end, mobile device 106 may for example use the radio positioning support map represented by the radio positioning support map information provided by the positioning server 200 to mobile device 106 to estimate an observation position based on at least three WLAN radio signals observed (e.g. received) by mobile device 106 at the observation position as disclosed above in more detail.

Additionally, mobile device 106 may be configured for capturing (a) radio observation report(s) and for reporting the captured radio observation report(s) to positioning server 200 (e.g. by transmitting the captured radio observation report(s) via communication path 107 to positioning server 200).

Figure 2:
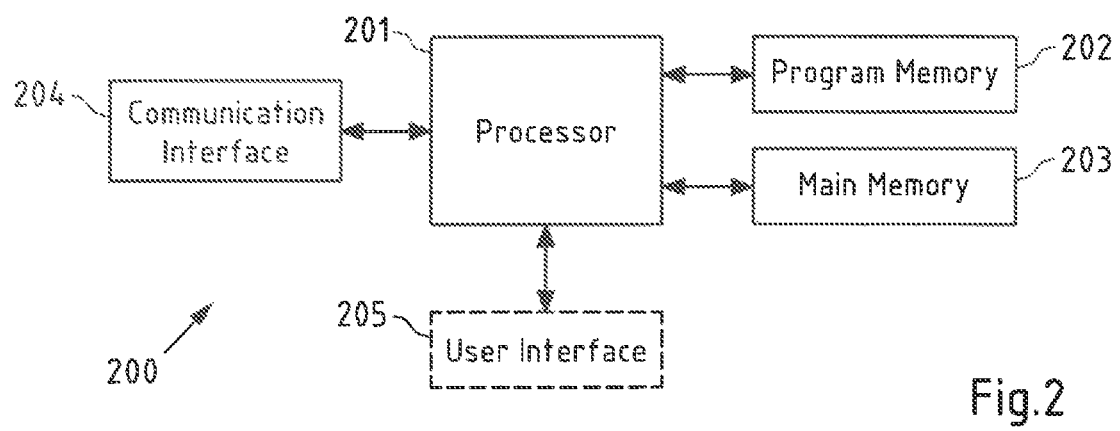
FIG. 2 is a block diagram of an exemplary embodiment of an apparatus according to the invention.

FIG. 2 is a block diagram of an exemplary embodiment of an apparatus according to the invention. In the following, it is assumed that this apparatus corresponds to positioning server 200 of system 100 of FIG. 1.

Positioning server 200 comprises a processor 201. Processor 201 may represent a single processor or two or more processors, which are for instance at least partially coupled, for instance via a bus. Processor 201 executes a program code stored in program memory 202 (for instance program code causing positioning server 200 to perform one or more of the embodiments of a method according to the invention or parts thereof (e.g. the method or parts of the method disclosed below with reference to flowchart 300 of FIG. 3), when executed on processor 201), and interfaces with a main memory 203. Program memory 202 may also contain an operating system for processor 201. Some or all of memories 202 and 203 may also be included into processor 201.

One of or both of a main memory and a program memory of a processor (e.g. program memory 202 and main memory 203) could be fixedly connected to the processor (e.g. processor 201) or at least partially removable from the processor, for instance in the form of a memory card or stick.

A program memory (e.g. program memory 202) may for instance be a non-volatile to memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 203) may for instance be a volatile memory. It may for instance be a DRAM memory, to give non-limiting example. It may for instance be used as a working memory for a processor (e.g. processor 201) when executing an operating system and/or programs.

Processor 201 further controls a communication interface 204 which is for example configured to communicate via a network like a cellular communication network. Positioning server 200 may use communication interface 204 to communicate with mobile device 106 (e.g. via communication path 107).

Furthermore, processor 201 controls an optional user interface 205 configured to present information to a user of positioning server 200 and/or to receive information from such a user. User interface 205 may for instance be the standard user interface via which a user of positioning server 200 controls other functionality thereof. Examples of such a user interface are a touch-sensitive display, a keyboard, a touchpad, a display, etc.

The components 202 to 205 of positioning server 200 may for instance be connected with processor 201 by means of one or more serial and/or parallel busses.

It is to be understood that positioning server 200 may comprise various other components.

Figure 3:
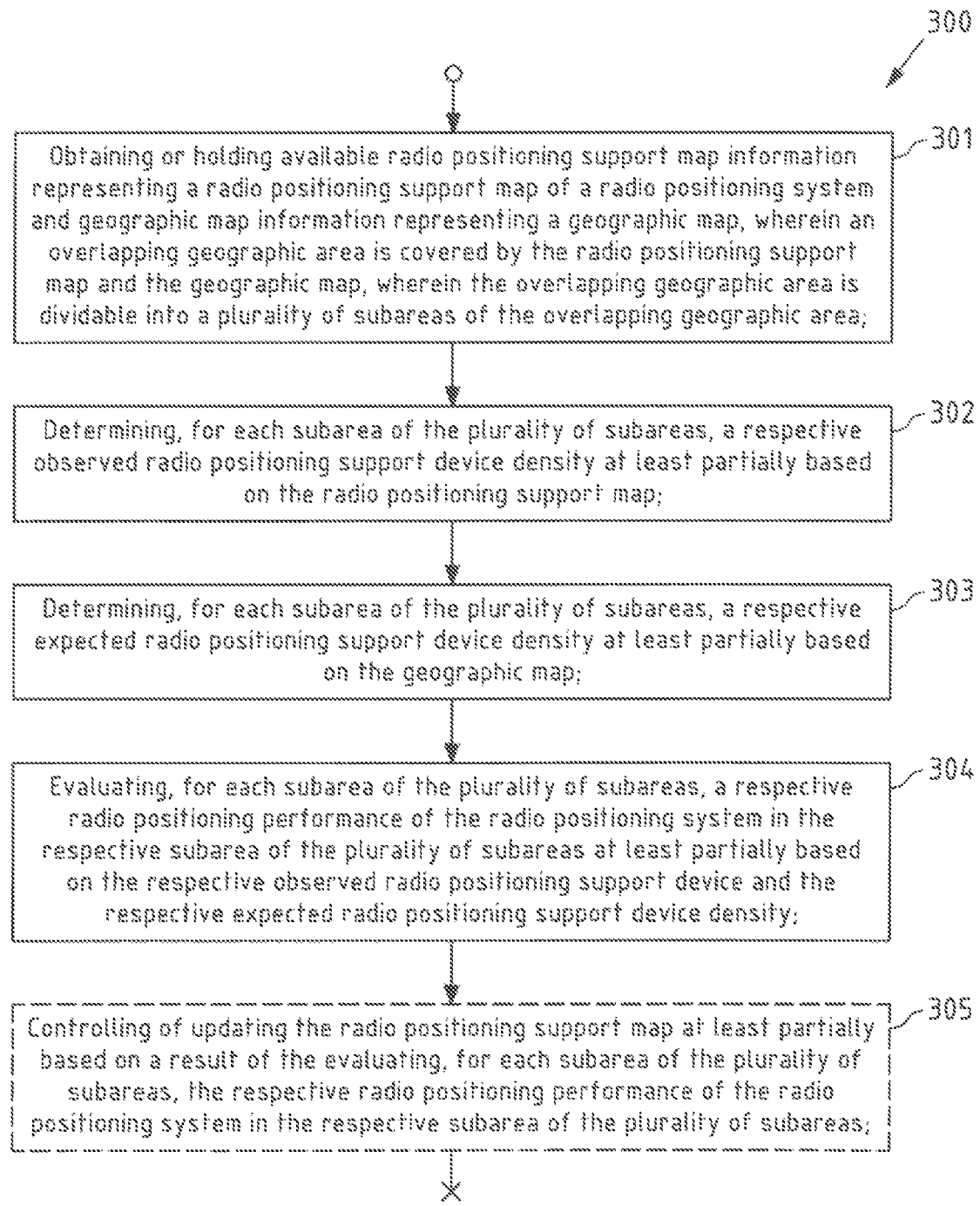
FIG. 3 is a flow chart illustrating an exemplary embodiment of a method according to the invention.

FIG. 3 is a flow chart 300 illustrating an exemplary embodiment of a method according to the invention. Without limiting the scope of the invention, it is assumed in the following that positioning server 200 of radio positioning system 100 as described above with respect to FIG. 1 performs the steps of flowchart 300.

In a step 301, radio positioning support map information representing a radio positioning support map of a radio positioning system and geographic map information representing a geographic map are obtained or hold available by positioning server 200. Therein, an overlapping geographic area is covered by the radio positioning support map and the geographic map, wherein the overlapping geographic area is dividable into a plurality of subareas of the overlapping geographic area.

The radio positioning support map information representing the radio positioning support map may for example be obtained in step 301 as a result of generating or updating the radio positioning support map. Alternatively or additionally, the radio positioning support map information representing the radio positioning support map may be hold available in step 301 by being stored in program memory 202. For example, the radio positioning support map information may be obtained as a result of generating or updating the radio positioning support map; and, subsequently, the radio positioning support map information may be stored in program memory 202.

The geographic map information representing the geographic map may for example be obtained in step 301 by receiving the geographic map information from a remote device. Alternatively or additionally, the geographic map information representing the geographic map may be hold available in step 301 by being stored in program memory 202. For example, geographic map information may be received; and, subsequently, the geographic map information may be stored in program memory 202.

Figure 4A:
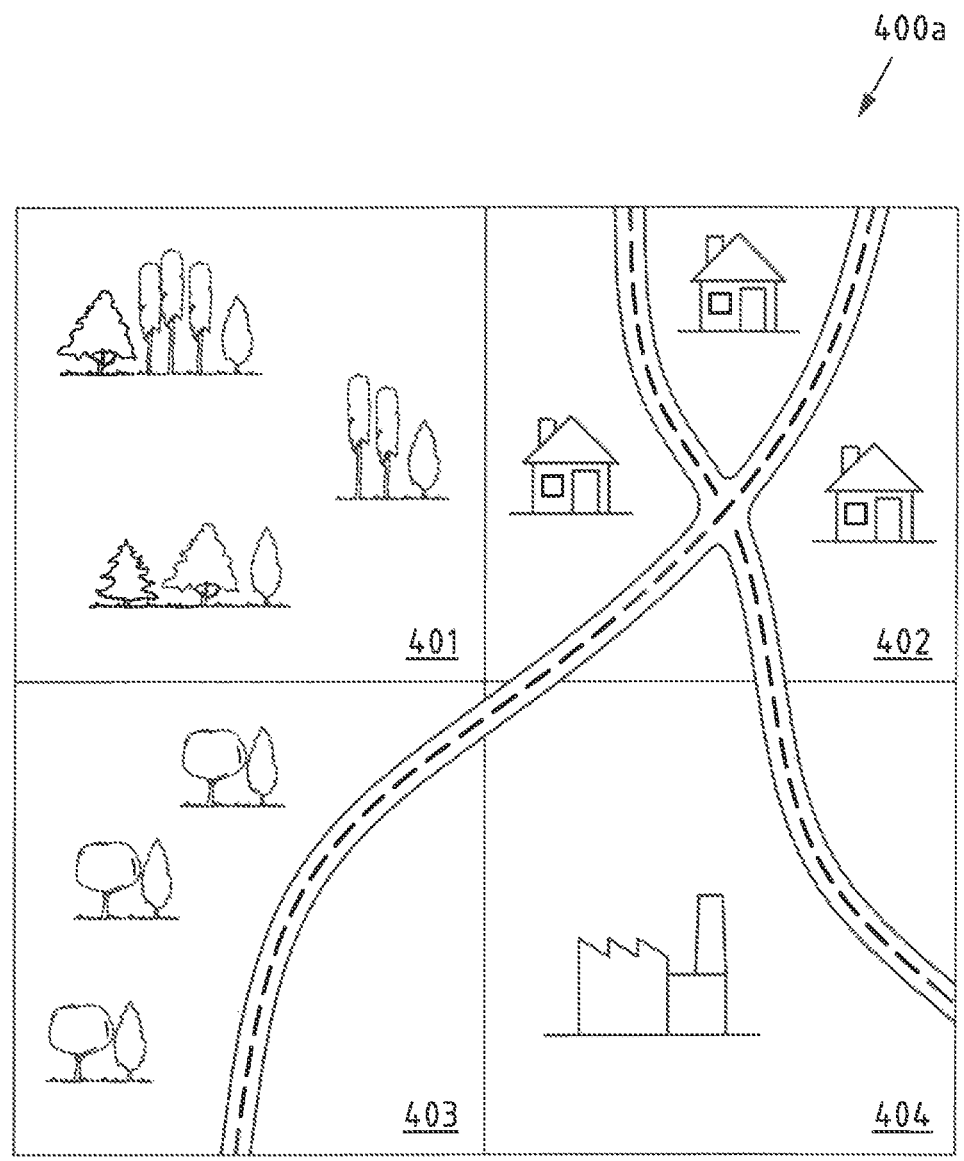
FIGS. 4a-4b are schematic illustrations of an exemplary geographic map and an exemplary radio positioning support map, respectively.
Figure 4B:
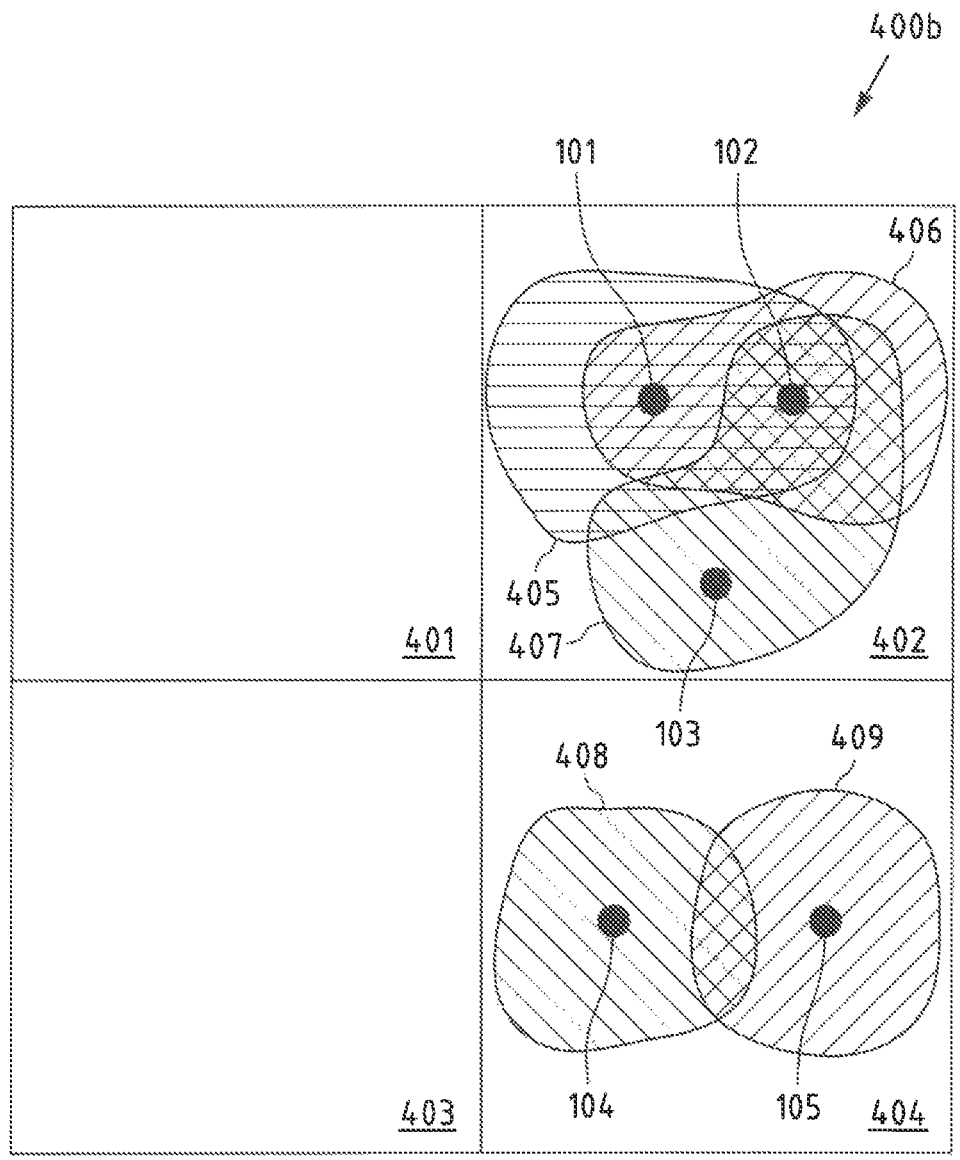

FIG. 4a shows an exemplary embodiment of a geographic map 400a, and FIG. 4b shows an exemplary embodiment of a radio positioning support map 400b. Geographic map 400a and radio positioning support map 400b cover the same geographic area which is dividable into subareas 401 to 404 (i.e. a plurality of subareas) as indicated in FIGS. 4a and 4b. For example, each of the plurality of subareas 401 to 404 corresponds to a respective square grid area of a square grid system having a predetermined grid spacing of 25 m such that each of the plurality of subareas 401 to 404 represents a surface area of 625 $m^2$.

Geographic map 400a is a two-dimensional topographical map representing route links (e.g. streets, footpaths, cycle paths, etc.) and subarea types (e.g. forest/lake/field areas, sub-urban (e.g. single house or apartment house) areas, urban (e.g. high-building) areas, residential areas, commercial areas, industrial areas and rural areas). In the following, it is assumed that geographic map indicates that subareas 401 and 403 are forest/lake/field areas, that subarea 402 is a sub-urban single house area and that subarea 404 is an industrial area.

Radio positioning support map 400b represents a respective installation position for each of radio positioning support devices 101 to 105. Furthermore, radio positioning support map 400b represents radio coverages 405 to 409, wherein each of radio coverages 405 to 409 describes the geographical area within which a radio signal transmitted by a respective radio positioning support device of radio positioning support devices 101 to 105 is expected to be observable (e.g. receivable with a minimum quality, e.g. a minimum signal-to-noise ratio and/or a minimum signal power, e.g. at least −90 dBm or −95 dBm) by a mobile device like mobile device 106. For example, radio coverage 405 may describe the geographical area within which a radio signal transmitted by radio positioning support device 101 is expected to be observable by a mobile device like mobile device 106.

It is to be understood that the invention is not limited to geographic map 400a and radio positioning support map 400b. In the following, it is thus referred to geographic map 400a and radio positioning support map 400b for exemplary purposes only without limiting the scope of the invention.

In a step 302, a respective observed radio positioning support device density is determined for each subarea of the plurality of subareas at least partially based on the radio positioning support map.

As disclosed above in more detail, a radio positioning support device density may be understood to represent the number of radio positioning support devices per unit area. Therein, the number of radio position support devices may be understood to be at least one of (1) the number of radio positioning support devices installed in a certain area or (2) the number of radio positioning support devices from which radio signals are observable in this certain area; and the area may be understood to be the surface area of this certain area (e.g. in case of a two-dimensional geographic map: the surface area of the earth as represented by the geographic map) or the combined surface and floor area of this certain area (e.g. in case of a three-dimensional geographic map: the sum of the surface area of the earth and the floor area of one or more buildings as represented by the geographic map).

Considering the geographic map 400a and the radio positioning support map 400b, each of the plurality of subareas represents a surface area of 625 m². Moreover, the number of radio positioning support devices is: 0 in subareas 401 and 403, 3 in subarea 402, and 2 in subarea 404. Accordingly, the observed radio positioning support device densities may be determined for the plurality of subareas 401 to 404 in step 302 as shown in the following table (with AP meaning WLAN access point or radio positioning support device):

| Subarea | Observed radio positioning support device density |
|---|---|
| 401 | 0 AP/m² |
| 402 | 0.0048 AP/m² |
| 403 | 0 AP/m² |
| 404 | 0.0032 AP/m² |

In a step 303, a respective expected radio positioning support device density is determined for each subarea of the plurality of subareas at least partially based on the geographic map.

As disclosed above, for different subarea types like forest/lake/field areas, sub-urban (e.g. single house or apartment house) areas, urban (e.g. high-building) areas, residential areas, commercial areas, industrial areas and rural areas different radio positioning support device densities may be expected, for example based on manual analysis of exemplary areas of the respective subarea type. Accordingly, the respective expected radio positioning support device density for a respective area type may be predetermined, for example by associating the respective area type with the respective expected radio positioning support device density. The following table is a non-limiting example of such a predetermined association between different subarea types and different expected radio positioning support device densities:

| Subarea type | Expected radio positioning support device density |
|---|---|
| Field/Forest/Lake | 0 AP/m2 |
| Industrial area | 0.005 AP/m² |
| Urban (high building) | 0.02 AP/m² |
| Rural area | 0.00001 AP/m² |
| Sub-urban (single-house) | 0.002 AP/m² |
| Sub-urban (apartment-house) | 0.01 AP/m² |

Based on this table, the observed radio positioning support device densities may be determined for the plurality of subareas 401 to 404 in step 303 as shown in the following table:

| Subarea | Subarea type | Expected radio positioning support device density |
|---|---|---|
| 401 | Field/Forest/Lake | 0 AP/m² |
| 402 | Sub-urban (single-house) | 0.002 AP/m² |
| 403 | Field/Forest/Lake | 0 AP/m² |
| 404 | Industrial area | 0.005 AP/m² |

In a step 304, a respective radio positioning performance of the radio positioning system in the respective subarea of the plurality of subareas is evaluated for each subarea of the plurality of subareas at least partially based on the respective observed radio positioning support device and the respective expected radio positioning support device density. As disclosed above, the respective radio positioning performance may be evaluated to be improvable if an improved radio positioning performance is determined to be achievable for the respective subarea; and a radio positioning performance may be evaluated to be satisfactory if an improved radio positioning performance is determined to be not achievable for the respective subarea.

To this end, the evaluating in step 304 may for example be performed by determining, for each subarea of the plurality of subareas, a respective ratio of the respective observed radio positioning support device density to the respective expected radio positioning support device density. Therein, the following two cases may be distinguished: (1) If the respective ratio is smaller than a predetermined threshold value, this may be considered to indicate that more radio positioning support devices are expected to be available in the respective subarea than represented by the radio positioning support map (e.g. represented in form of installation positions or radio coverages). In this case, the respective radio positioning performance of radio positioning system 100 may for example be expected to be improved by further collecting radio observation reports in the respective subarea and, thus, it may be determined as a result of the evaluating in step 304 that the radio positioning performance of radio positioning system 100 is improvable in the respective subarea. (2) If the respective ratio is not smaller than the predetermined threshold value (e.g. equal to or greater than the predetermined threshold value or undefined), this may be considered to indicate that no more radio positioning support devices are expected to be available in the respective subarea than represented by the radio positioning support map (e.g. represented in form of installation positions or radio coverages). In this case, no further improvement of the radio positioning performance in the respective subarea may be expected by further collecting radio observation reports and, thus, it may be determined as a result of the evaluating in step 304 that the radio positioning performance of radio positioning system 100 is satisfactory (i.e. not improvable) in the respective subarea.

As disclosed above, the predetermined threshold value may be predetermined such that the respective ratio of the respective observed radio positioning support device density to the respective real radio positioning support device density is expected (e.g. with a likelihood of at least 90% or 95%) to be smaller than 1 if it is determined that the respective ratio of the respective observed radio positioning support device density to the respective expected radio positioning support device density is smaller than the predetermined threshold value. To this end, the predetermined threshold value may take into account uncertainties (e.g. errors) in determining the respective expected radio positioning support device density. In the following, it is assumed that the predetermined threshold value is 1.

The following table shows, for each subarea of subareas 401 to 404, the respective ratio of the observed radio positioning support device density to the respective expected radio positioning support density and the respective radio positioning performance of radio positioning system 100:

In an optional step 305, the result(s) of the evaluating of step 304 may be used for controlling updating the radio positioning support map like radio positioning support map 400b. To this end, positioning server 200 may determine control information for capturing radio observation reports in the overlapping geographic area at least partially based on the result(s) of the evaluating of step 304 and provide the control information to one or more mobile devices like mobile device 106 (e.g. by transmitting the control information via communication path 107 to mobile device 106).

The control information for capturing radio observation reports in the overlapping geographic area may be configured to cause mobile device 106 to capture radio observation reports in the overlapping geographic area, for example to capture radio observation reports in one or more subareas of the plurality of subareas and/or with a certain capturing rate or frequency. To this end, the control information may for example indicate to mobile device 106 at least one of (1) the one or more subareas of the plurality of subareas where radio observation reports are to be captured and (2) the capturing rate or frequency with which radio observation reports are to be captured in the one or more subareas of the plurality of subareas. To give a non-limiting example, the control information may be determined to cause mobile device 106 to capture radio observation reports in each subarea of the plurality of subareas for which the respective radio positioning performance is determined to be improvable as a result of the evaluating in step 304 with a higher capturing rate or frequency than in the other subareas of the plurality of subareas. Accordingly, the control information for capturing radio observation reports may be configured to cause mobile device 106 to capture radio observation reports in subarea 404 with a higher capturing rate or frequency than in subareas 401 to 403. Therein, the capturing rate or frequency may define how many radio observation reports are captured per unit time.

| Subarea | Observed radio positioning support device density | Expected radio positioning support device density | Ratio of observed radio positioning support device density to expected radio positioning support device density | Radio positioning performance of radio positioning system |
|---|---|---|---|---|
| 401 | 0 $AP/m^2$ | 0 $AP/m^2$ | 1 or undefined | Satisfactory |
| 402 | 0.0048 $AP/m^2$ | 0.002 $AP/m^2$ | 2.4 | Satisfactory |
| 403 | 0 $AP/m^2$ | 0 $AP/m^2$ | 1 or undefined | Satisfactory |
| 404 | 0.0032 $AP/m^2$ | 0.005 $AP/m^2$ | 0.64 | Improvable |

As apparent from this table, the radio positioning performances of radio positioning system 100 are determined to be satisfactory in subareas 401 to 403; and, the radio positioning performance of radio positioning system 100 is determined to be improvable in subarea 404. Thus, it may be assumed that further collecting radio observation reports in subareas 401 to 403 for updating radio positioning support map 400b may not further improve the radio positioning performance of radio positioning system 100 in these subareas because it is expected that no further radio positioning support devices are available in these subareas; and, it may be assumed that further collecting radio observation reports in subarea 404 for updating radio positioning support map 404 may further improve the radio positioning performance of radio positioning system 100 in this subarea because it is expected that further radio positioning support devices are available in this subarea.

By controlling the updating of the radio positioning support map at least partially based on the results of the evaluating of step 304, capturing of radio observation reports may be focused on subareas where an improved radio positioning performance of radio positioning system 100 is expected to be achievable resulting in an efficient capturing of radio observation reports resulting and an efficient use of resources of the one or more mobile devices like mobile device 106.

It is to be understood that the orders of the steps of flowchart 300 is only exemplary and that the steps may also have a different order if possible. Furthermore, it is also possible that two or more steps may be performed in one step.

Figure 5:
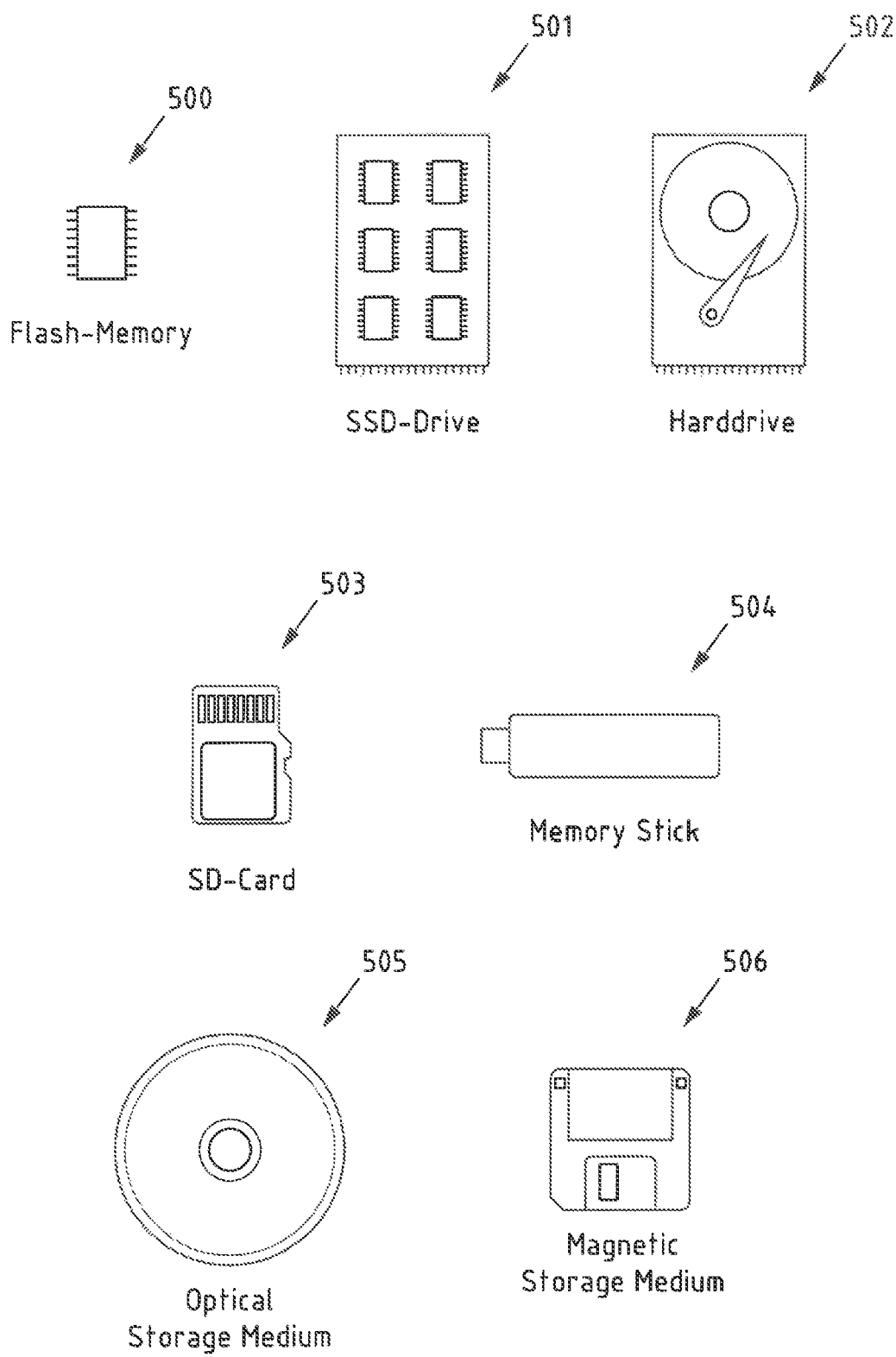
FIG. 5 is a schematic illustration of examples of tangible and non-transitory storage media.

FIG. 5 is a schematic illustration of examples of tangible and non-transitory computer-readable storage media according to the present invention that may for instance be used to implement memory 202 of FIG. 2. To this end, FIG. 5 displays a flash memory 500, which may for instance be soldered or bonded to a printed circuit board, a solid-state drive 501 comprising a plurality of memory chips (e.g. Flash memory chips), a magnetic hard drive 502, a Secure Digital (SD) card 503, a Universal Serial Bus (USB) memory stick 504, an optical storage medium 505 (such as for instance a CD-ROM or DVD) and a magnetic storage medium 506.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processor 201 of FIG. 2, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method, comprising:
    obtaining or holding available radio positioning support map information representing a radio positioning support map of a radio positioning system and geographic map information representing a geographic map, wherein an overlapping geographic area is covered by said radio positioning support map and said geographic map, wherein said overlapping geographic area is dividable into a plurality of subareas of said overlapping geographic area;
    determining, for each subarea of said plurality of subareas, a respective observed radio positioning support device density at least partially based on said radio positioning support map;
    determining, for each subarea of said plurality of subareas, a respective expected radio positioning support device density at least partially based on said geographic map; and
    evaluating, for each subarea of said plurality of subareas, a respective radio positioning performance of said radio positioning system in said respective subarea of said plurality of subareas at least partially based on said respective observed radio positioning support device density and said respective expected radio positioning support device density.

2. Method according to claim 1, wherein said radio positioning support map represents, for each radio positioning support device of a plurality of radio positioning support devices, at least one of a respective radio coverage or a respective installation position.

3. Method according to claim 2, wherein each radio positioning support device of said plurality of radio positioning support devices is one of:
    a Bluetooth radio device;
    a WLAN radio device;
    a cellular radio device; or
    a LPWAN radio device.

4. Method according to claim 2, wherein, for each subarea of said plurality of subareas, said respective observed radio positioning support device density is determined at least partially based on at least one of said radio coverages or said installation positions represented by said radio positioning support map.

5. Method according to claim 1, wherein, for each subarea of said plurality of subareas, said respective expected radio positioning support device density is determined by at least one of:
    determining, for each subarea of said plurality of subareas, a respective subarea type at least partially based on said geographic map; or
    determining, for each subarea of said plurality of subareas, said respective expected radio positioning support device density at least partially based on said respective subarea type of said respective subarea of said plurality of subareas.

6. Method according to claim 5, wherein said respective subarea type determined for each subarea of said plurality of subareas is part of a plurality of subarea types, wherein said respective expected radio positioning support device density determined for each subarea of said plurality of subareas is part of a plurality of expected radio positioning support device densities, and wherein each subarea type of said plurality of subarea types is associated with a respective expected radio positioning support device density of said plurality of expected radio positioning support device densities.

7. Method according to claim 6, said method comprising at least one of:
   determining said plurality of expected radio positioning support device densities;
   determining said plurality of subarea types; or
   associating each subarea type of said plurality of subarea types with a respective expected radio positioning support device density of said plurality of expected radio positioning support device densities.

8. Method according to claim 1, wherein said respective radio positioning performance of said radio positioning system in said respective subarea of said plurality of subareas is evaluated for each subarea of said plurality of subareas by at least one of:
   determining, for each subarea of said plurality of subareas, a respective ratio of said respective observed radio positioning support device density to said respective expected radio positioning support device density;
   determining, for each subarea of said plurality of subareas, whether or not said respective ratio of said respective observed radio positioning support device density to said respective expected radio positioning support device density is smaller than a predetermined threshold value or smaller than 1;
   determining said respective radio positioning performance of said radio positioning system in said respective subarea of said plurality of subareas to be improvable if it is determined that said respective ratio of said respective observed radio positioning support device density to said respective expected radio positioning support device density is smaller than said predetermined threshold value or smaller than 1; or
   determining said respective radio positioning performance of said radio positioning system in said respective subarea of said plurality of subareas to be satisfactory if it is determined that said respective ratio of said respective observed radio positioning support device density to said respective expected radio positioning support device density is not smaller than said predetermined threshold value or not smaller than 1.

9. Method according to claim 1, said method further comprising at least one of:
   controlling of updating said radio positioning support map at least partially based on a result of said evaluating, for each subarea of said plurality of subareas, said respective radio positioning performance of said radio positioning system in said respective subarea of said plurality of subareas;
   determining control information for capturing radio observation reports in said overlapping geographic area at least partially based on said result of said evaluating, for each subarea of said plurality of subareas, said respective radio positioning performance of said radio positioning system in said respective subarea of said plurality of subareas; or
   providing said control information to one or more mobile devices.

10. Method according to claim 1, said method further comprising at least one of:
    collecting a plurality of radio observation reports captured by one or more mobile devices in said overlapping geographic region; or
    updating said radio positioning support map at least partially based on said plurality of radio observation reports.

11. Method according to claim 1, wherein said geographic map is or comprises at least one of:
    a two-dimensional map;
    a three-dimensional map;
    a navigational or street map;
    a floor map; or
    a topographic map.

12. Method according to claim 1, wherein each subarea of said plurality of subareas corresponds to a respective grid area of a grid system having a predetermined or adjustable grid spacing.

13. An apparatus comprising at least one processor and at least one memory containing computer program code, the at least one memory and the computer program code with the at least one processor configured to cause the apparatus at least to:
    obtain or hold available radio positioning support map information representing a radio positioning support map of a radio positioning system and geographic map information representing a geographic map, wherein an overlapping geographic area is covered by said radio positioning support map and said geographic map, wherein said overlapping geographic area is dividable into a plurality of subareas of said overlapping geographic area;
    determine, for each subarea of said plurality of subareas, a respective observed radio positioning support device density at least partially based on said radio positioning support map;
    determine, for each subarea of said plurality of subareas, a respective expected radio positioning support device density at least partially based on said geographic map; and
    evaluate, for each subarea of said plurality of subareas, a respective radio positioning performance of said radio positioning system in said respective subarea of said plurality of subareas at least partially based on said respective observed radio positioning support device density and said respective expected radio positioning support device density.

14. Apparatus according to claim 13, wherein said radio positioning support map represents, for each radio positioning support device of a plurality of radio positioning support devices, at least one of a respective radio coverage or a respective installation position, and wherein, for each subarea of said plurality of subareas, the at least one memory and the computer program code with the at least one processor are further configured to cause the apparatus to determine said respective observed radio positioning support device density at least partially based on at least one of said radio coverages or said installation positions represented by said radio positioning support map.

15. Apparatus according to claim 13, wherein, for each subarea of said plurality of subareas, the at least one memory and the computer program code with the at least one processor are further configured to cause the apparatus to determine said respective expected radio positioning support device density by at least one of:
    determining, for each subarea of said plurality of subareas, a respective subarea type at least partially based on said geographic map; or
    determining, for each subarea of said plurality of subareas, said respective expected radio positioning support device density at least partially based on said respective subarea type of said respective subarea of said plurality of subareas.

16. Apparatus according to claim 15, wherein said respective subarea type determined for each subarea of said plurality of subareas is part of a plurality of subarea types, wherein said respective expected radio positioning support device density determined for each subarea of said plurality of subareas is part of a plurality of expected radio positioning support device densities, and wherein each subarea type of said plurality of subarea types is associated with a respective expected radio positioning support device density of said plurality of expected radio positioning support device densities.

17. Apparatus according to claim 16, wherein the at least one memory and the computer program code with the at least one processor are further configured to cause the apparatus to:
determine said plurality of expected radio positioning support device densities;
determine said plurality of subarea types; or
associate each subarea type of said plurality of subarea types with a respective expected radio positioning support device density of said plurality of expected radio positioning support device densities.

18. Apparatus according to claim 13, wherein the at least one memory and the computer program code with the at least one processor are further configured to cause the apparatus to evaluate said respective radio positioning performance of said radio positioning system in said respective subarea of said plurality of subareas by at least one of:
determining, for each subarea of said plurality of subareas, a respective ratio of said respective observed radio positioning support device density to said respective expected radio positioning support device density;
determining, for each subarea of said plurality of subareas, whether or not said respective ratio of said respective observed radio positioning support device density to said respective expected radio positioning support device density is smaller than a predetermined threshold value or smaller than 1;
determining said respective radio positioning performance of said radio positioning system in said respective subarea of said plurality of subareas to be improvable if it is determined that said respective ratio of said respective observed radio positioning support device density to said respective expected radio positioning support device density is smaller than said predetermined threshold value or smaller than 1; or
determining said respective radio positioning performance of said radio positioning system in said respective subarea of said plurality of subareas to be satisfactory if it is determined that said respective ratio of said respective observed radio positioning support device density to said respective expected radio positioning support device density is not smaller than said predetermined threshold value or not smaller than 1.

19. Apparatus according to claim 13, wherein the at least one memory and the computer program code with the at least one processor are further configured to cause the apparatus to perform at least one of:
control of updating said radio positioning support map at least partially based on a result of said evaluating, for each subarea of said plurality of subareas, said respective radio positioning performance of said radio positioning system in said respective subarea of said plurality of subareas;
determine control information for capturing radio observation reports in said overlapping geographic area at least partially based on said result of said evaluating, for each subarea of said plurality of subareas, said respective radio positioning performance of said radio positioning system in said respective subarea of said plurality of subareas; or
provide said control information to one or more mobile devices.

20. A non-transitory computer readable storage medium configured to store computer program code, wherein the computer program code comprises instructions configured, upon execution, to:
obtain or hold available radio positioning support map information representing a radio positioning support map of a radio positioning system and geographic map information representing a geographic map, wherein an overlapping geographic area is covered by said radio positioning support map and said geographic map, wherein said overlapping geographic area is dividable into a plurality of subareas of said overlapping geographic area;
determine, for each subarea of said plurality of subareas, a respective observed radio positioning support device density at least partially based on said radio positioning support map;
determine, for each subarea of said plurality of subareas, a respective expected radio positioning support device density at least partially based on said geographic map; and
evaluate, for each subarea of said plurality of subareas, a respective radio positioning performance of said radio positioning system in said respective subarea of said plurality of subareas at least partially based on said respective observed radio positioning support device density and said respective expected radio positioning support device density.

* * * * *